(12) United States Patent
Bradley et al.

(10) Patent No.: US 7,555,557 B2
(45) Date of Patent: Jun. 30, 2009

(54) REVIEW AND APPROVAL SYSTEM

(75) Inventors: Janette Bradley, Lowell, MA (US); Paul J. Gray, Woburn, MA (US); Glenn Lea, Marblehead, MA (US); Michael E. Phillips, Melrose, MA (US); Peter Scannell, Lowell, MA (US); Dustin A. Simms, Nashua, NH (US)

(73) Assignee: Avid Technology, Inc., Tewksbury, MA (US)

( * ) Notice: Subject to any disclaimer, the term of this patent is extended or adjusted under 35 U.S.C. 154(b) by 548 days.

(21) Appl. No.: 11/020,616

(22) Filed: Dec. 22, 2004

(65) Prior Publication Data

US 2005/0120127 A1 Jun. 2, 2005

Related U.S. Application Data

(63) Continuation of application No. 09/543,958, filed on Apr. 7, 2000, now abandoned.

(51) Int. Cl.
*G06F 15/16* (2006.01)
(52) U.S. Cl. .......................... 709/231; 715/723; 725/46; 709/205
(58) Field of Classification Search .............. 707/104.1; 715/500.1, 512, 513, 723, 719, 223, 234; 348/474; 709/205, 231; 725/46
See application file for complete search history.

(56) References Cited

U.S. PATENT DOCUMENTS

| | | | |
|---|---|---|---|
| 4,538,188 A | 8/1985 | Barker et al. | |
| 4,685,003 A | 8/1987 | Westland | |
| 4,746,994 A | 5/1988 | Ettlinger | |
| 5,012,334 A | 4/1991 | Etra | |
| 5,045,940 A | 9/1991 | Peters et al. | |
| 5,196,933 A | 3/1993 | Henot | |
| 5,214,528 A | 5/1993 | Akanabe et al. | |
| 5,237,648 A | 8/1993 | Mills et al. | |
| 5,267,351 A | 11/1993 | Reber et al. | |
| 5,274,758 A | 12/1993 | Beitel et al. | |
| 5,307,456 A | 4/1994 | MacKay | |
| 5,317,732 A | 5/1994 | Gerlach, Jr. et al. | |
| 5,355,450 A | 10/1994 | Garmon et al. | |
| 5,390,138 A | 2/1995 | Milne et al. | |
| 5,404,316 A | 4/1995 | Klinger et al. | |
| 5,428,731 A | 6/1995 | Powers, III | |

(Continued)

FOREIGN PATENT DOCUMENTS

EP 0403118 12/1990

(Continued)

OTHER PUBLICATIONS

U.S. Appl. No. 09/539,749, filed Mar. 31, 2000, Balkus et al.

(Continued)

*Primary Examiner*—Jungwon Chang
(74) *Attorney, Agent, or Firm*—Peter J. Gordon; Fish & Ricahrdson; Oliver Strimpel

(57) ABSTRACT

The review and Approval system of the present invention advantageously provides computer implemented access for a reviewer to digital content for the purpose of reviewing and approving the digital content. The system is capable of communication with an editing system, and automatically informing an editor of the reviewer's comments.

22 Claims, 13 Drawing Sheets

U.S. PATENT DOCUMENTS

| | | | |
|---|---|---|---|
| 5,442,744 A | 8/1995 | Piech et al. |
| 5,467,288 A | 11/1995 | Fasciano et al. |
| 5,488,433 A | 1/1996 | Washino et al. |
| 5,489,947 A | 2/1996 | Cooper |
| 5,493,568 A | 2/1996 | Sampat et al. |
| 5,513,306 A | 4/1996 | Mills et al. |
| 5,515,490 A | 5/1996 | Buchanan et al. |
| 5,534,942 A | 7/1996 | Beyers, Jr. et al. |
| 5,537,141 A | 7/1996 | Harper et al. |
| 5,537,157 A | 7/1996 | Washino et al. |
| 5,539,869 A | 7/1996 | Spoto et al. |
| 5,541,662 A | 7/1996 | Adams et al. |
| 5,561,457 A | 10/1996 | Cragun et al. |
| 5,568,275 A | 10/1996 | Norton et al. |
| 5,577,190 A | 11/1996 | Peters et al. |
| 5,584,006 A | 12/1996 | Reber et al. |
| 5,585,858 A | 12/1996 | Harper et al. |
| 5,592,602 A | 1/1997 | Edmunds et al. |
| 5,613,057 A | 3/1997 | Caravel et al. |
| 5,617,146 A | 4/1997 | Duffield et al. |
| 5,619,636 A | 4/1997 | Sweat et al. |
| 5,623,308 A | 4/1997 | Civanlar et al. |
| 5,652,714 A | 7/1997 | Peterson et al. |
| 5,659,790 A | 8/1997 | Kim et al. |
| 5,659,792 A | 8/1997 | Walmsley |
| 5,659,793 A | 8/1997 | Escobar et al. |
| 5,664,216 A | 9/1997 | Blumenau |
| 5,680,619 A | 10/1997 | Gudmundson et al. |
| 5,682,326 A | 10/1997 | Klinger et al. |
| 5,684,963 A | 11/1997 | Clement et al. |
| 5,712,953 A | 1/1998 | Langs |
| 5,724,605 A | 3/1998 | Wissner |
| 5,752,029 A | 5/1998 | Wissner |
| 5,754,851 A | 5/1998 | Wissner |
| 5,760,767 A | 6/1998 | Shore et al. |
| 5,764,275 A | 6/1998 | Lappington et al. |
| 5,767,846 A | 6/1998 | Nakamura et al. |
| 5,781,435 A | 7/1998 | Holroyd et al. |
| 5,801,685 A | 9/1998 | Miller et al. |
| 5,822,019 A | 10/1998 | Takeuchi |
| 5,826,102 A | 10/1998 | Escobar et al. |
| 5,852,435 A | 12/1998 | Vigneaux et al. |
| 5,860,073 A | 1/1999 | Ferrel et al. |
| 5,861,881 A | 1/1999 | Freeman et al. |
| 5,889,514 A | 3/1999 | Boezeman et al. |
| 5,892,506 A | 4/1999 | Hermanson |
| 5,892,507 A | 4/1999 | Moorby et al. |
| 5,905,841 A | 5/1999 | Peters et al. |
| 5,907,366 A | 5/1999 | Farmer et al. |
| 5,910,825 A | 6/1999 | Takeuchi |
| 5,926,613 A | 7/1999 | Schaffer |
| 5,930,445 A | 7/1999 | Peters et al. |
| 5,969,716 A | 10/1999 | Davis et al. |
| 5,977,962 A | 11/1999 | Chapman et al. |
| 5,978,648 A | 11/1999 | George et al. |
| 5,982,445 A | 11/1999 | Eyer et al. |
| 5,995,951 A | 11/1999 | Ferguson |
| 5,999,173 A | 12/1999 | Ubillos |
| 6,016,362 A | 1/2000 | Kato et al. |
| 6,037,932 A | 3/2000 | Feinleib |
| 6,038,573 A | 3/2000 | Parks |
| 6,058,236 A | 5/2000 | Peters et al. |
| 6,081,262 A | 6/2000 | Gill et al. |
| 6,091,407 A | 7/2000 | Boetje et al. |
| 6,092,122 A | 7/2000 | Liu et al. |
| 6,118,444 A | 9/2000 | Garmon et al. |
| 6,195,497 B1 | 2/2001 | Nagasaka et al. |
| 6,199,082 B1 | 3/2001 | Ferrel et al. |
| 6,201,924 B1 | 3/2001 | Crane et al. |
| 6,212,527 B1 | 4/2001 | Gustman |
| 6,230,173 B1 | 5/2001 | Ferrel et al. |
| 6,243,087 B1 | 6/2001 | Davis et al. |
| 6,249,280 B1 | 6/2001 | Garmon et al. |
| 6,262,723 B1 | 7/2001 | Matsuzawa et al. |
| 6,262,724 B1 | 7/2001 | Crow et al. |
| 6,330,004 B1 | 12/2001 | Matsuzawa et al. |
| 6,353,461 B1 | 3/2002 | Shore et al. |
| 6,400,378 B1 | 6/2002 | Snook |
| 6,404,978 B1 | 6/2002 | Abe |
| 6,411,725 B1 | 6/2002 | Rhoads |
| 6,426,778 B1 | 7/2002 | Valdez, Jr. |
| 6,430,355 B1 | 8/2002 | Nagasawa |
| 6,476,828 B1 | 11/2002 | Burkett et al. |
| 6,848,199 B1 | 11/2002 | Eyal |
| 6,489,969 B1 | 12/2002 | Garmon et al. |
| 6,518,978 B1* | 2/2003 | Omata et al. ................ 715/723 |
| 6,544,294 B1 | 4/2003 | Greenfield et al. |
| 6,545,689 B1* | 4/2003 | Tunli ......................... 715/719 |
| 6,546,405 B2* | 4/2003 | Gupta et al. ................ 715/512 |
| 6,553,142 B2 | 4/2003 | Peters |
| 6,564,263 B1 | 5/2003 | Bergman et al. |
| 6,618,547 B1 | 9/2003 | Peters et al. |
| 6,654,933 B1 | 11/2003 | Abbott et al. |
| 6,802,041 B1* | 10/2004 | Rehm ...................... 715/500.1 |
| 6,954,894 B1* | 10/2005 | Balnaves et al. ......... 715/500.1 |
| 7,050,110 B1* | 5/2006 | Lienhart et al. ............. 348/474 |
| 7,194,679 B1* | 3/2007 | Green ....................... 715/513 |
| 2002/0188628 A1 | 12/2002 | Cooper et al. |
| 2003/0018609 A1 | 1/2003 | Phillips et al. |
| 2004/0268224 A1 | 12/2004 | Balkus et al. |
| 2007/0011206 A1* | 1/2007 | Gupta et al. ............. 707/104.1 |

FOREIGN PATENT DOCUMENTS

| | | |
|---|---|---|
| EP | 0469850 | 2/1992 |
| EP | 0526064 | 2/1993 |
| EP | 0564247 | 10/1993 |
| EP | 0592250 | 4/1994 |
| EP | 0596823 | 5/1994 |
| EP | 0613145 | 8/1994 |
| EP | 0689133 | 12/1995 |
| EP | 0706124 | 4/1996 |
| GB | 2336025 | 10/1999 |
| WO | WO88/07719 | 10/1988 |
| WO | WO 93/21636 | 10/1993 |
| WO | WO94/03897 | 2/1994 |
| WO | WO94/29868 | 12/1994 |
| WO | WO96/26600 | 8/1996 |
| WO | WO96/31829 | 10/1996 |
| WO | WO96/36007 | 11/1996 |
| WO | WO97/12342 | 4/1997 |
| WO | WO97/37497 | 10/1997 |
| WO | WO98/04984 | 2/1998 |
| WO | WO99/52045 | 10/1999 |
| WO | WO00/73875 | 12/2000 |

OTHER PUBLICATIONS

AAF Specification Version 1.0 DR4, 2000, pp. i-181.

Ackermann, Phillipp, "Design and Implementation of an Object-oriented Media Composition Framework", Int'l. Computer Music Conference, 1994.

Agnew, J.N. et al., "The Right Tool for the Job: A Quest for the Perfect Authoring Package", Proceedings of SIGDOC '92: $10^{th}$ Annual ACM Conference on Systems Documentation, Oct. 1992, Ottawa, Ontario, Canada, pp. 253-258.

"Authorware Users Guide", Macromedia Inc., 1992, pp. 8-9, 12-13, 15, 17, 20, 25, 28-31, 36-37, 43, 46-47, 115, 178-179, 191, 232, 242, 301-302.

Baecker, R. et al., "A Multimedia System for Authoring Motion Pictures", ACM Multimedia 1996, pp. 31-42.

Blakowski, Gerold, et al., "Tools for Specifiying and Executing Synchronized Multimedia Presentations", Proc. $2^{nd}$ Int'l. Workshop on OS for Digital Audio Video, Nov. 18-19, 1991, pp. 271-279.

The Brughetti Corporation, Product Information for PURE Image Creator, SLICE Transition Maker and AIR Playout Manager, 1994, (11 pages).

Buchanan, M. Cecelia, et al., "Automatic Temporal Layout Mechanisms", Proc. ACM Multimedia 1993. pp. 341-350.

Buchanan, M. Cecelia, et al., "Specifying Temporal Behavior in Hypermedia Documents", ECHT '92, pp. 262-271.

Buford, John F., "Integrating Object-Oriented Scripting Languages with HyTime", from Proceedings of ICMCS 1994 IEEE, pp. 1-10.

Butlerman, Dick C.A., et al., "Multimedia Authoring Tools: State of the Art and Research Challenges", LNCS 1000, 1995, pp. 1-17.

Chiu, Patrick et al., A Dynamic Grouping Technique for Ink and Audio Notes, USIT -98, San Francisco, CA, 1998 ACM, pp. 195-202.

Chiueh, Tzi-cker, et al., Zodiac: A History-Based Interactive Video Authoring System:, ACM Multimedia '98, Bristol, UK, 1998 ACM, pp. 435-443.

Chua, Tat-Seng, et al., "A Video Retrieval and Sequencing System", ACM Transactions on Information Systems, vol. 13, No. 4, Oct. 1995, pp. 373-407.

"The Coming Revolution", Communications of the ACM, Jul. 1989, vol. 32, No. 7, pp. 794-901.

Csinger, Andrew, et al., "AI Meets Authoring: User Models for Intelligent Multimedia, Artificial Intelligence Review, special issue on user modelling", 8, pp. 447-468, 1995.

Drapeau, George D. et al., "MAEstro-A Distributed Multimedia Authoring Environment", USENIX, Summer 1991, pp. 315-328.

Drapeau, George D., "Synchronization in the MAEstro Multimedia Authoring Environment", ACM Multimedia 1993, pp. 331-340.

Davenport, Gloriana, et al., "Cinematic Primitives for Multimedia", 1991 IEEE, Jul. 1991, pp. 67-74.

The Electronic Scrapbook: Towards an Intelligent Home-Video Editing System, by Amy Susan Bruckman, Sep. 1991, Video Mosaic: Laying Out Time In a Physical Space.

Eun, Seong Bae, et al., "Specification of Multimedia Compostiion and A Visual Programming Environment", Proceeding of the first ACM International Conference on Multimedia, pp. 167-173, 1993.

Gephard, C., Der Widersenstigen Zahmung: Computer & Video Radio Fernsehen Electronik, vol. 44, No. 1, Jan. 1, 1995, Berlin, DE.

Gibbs, Simon, "Composite Multimedia and Active Objects", in Proc. OOPSLA 1991, pp. 1-16.

Gibbs, Simon, "Data Modeling of Time-Based Media", SIGMOD '94, 1994 ACM, pp. 91-102.

Gibbs, Simon, "Video Nodes and Video Webs: Uses of Video in Hypermedia", Proc. ACM Conf. on Hypertext, 1992, p. 3.

Girgensohn, Andreas, et al., "A Semi-automatic Approach to Home Video Editing", UIST '00, San Diego, CA, 2000 ACM, CHI Letters vol. 2, 2, pp. 81-89.

Gruenette R., "Authorware and IconAuthor", CD-ROM Professional, vol. 8, No. 10, Oct. 1995, pp. 81-98.

Hardman, H., "New Authoring Tools for Windows", BYTE, vol. 18, No. 9, Aug. 1993, pp. 153-156.

Hardman, Lynda, et al, "Authoring Interactive Multimedia: Problems and Prospects", CWI Quarterly, vol. 7(1) 1994, pp. 47-66.

Hardman, Lynda, et al., "Structured Multimedia Authoring", ACM Multimedia 1993, pp. 283-289.

Herman, I., et al., "MADE: A Multimedia Application Development Environment", CWI Quarterly, vol. 7(1) 1994, pp. 27-46.

Hirata, Kyoji, et al., "Content-Oriented Integration in Hypermedia Systems," Hypertext '86, 7th ACM Conf. On Hypertext, Conf. 7, Mar. 1996, pp. 11-21.

Hirzalla, Nael, et al, "A temporal Model for Interactive Multimedia Scenarios", in IEEE Multimedia, vol. 2, No. 3, Fall 1995, pp. 24-31.

Hudson, Scott E., et al., "The Walk-Through Approach To Authoring Multimedia Documents", Multimedia '94, 1994 ACM, pp. 173-180.

Hung, Yung-Chen, "A Hypervideo System Generator", Software Practice and Experience, vol. 17(11), Nov. 1997, pp. 1263-1281.

Koegel, J.F., et al., "Improving Visual Programming Languages for Multimedia Authoring", Educational Multimedia and Hypermedia Annula, 1993, Proceedings of Ed-Media 93-World on Educational Multimedia And Hypermedia, Jun. 1993, Orlando, FL, pp. 286-293.

Kurlander, David, et al., "A Visual Language for Browsing, Undoing, and Redoing Graphical Interface Commands", in Visual Languages and Visual Programming, 1990, pp. 257-275.

Mackay, W.E., et al., "Video Mosaic: Laying Out Time In A Physical Space",Proceedings of Multimedia '94, San Francisco, CA, ACM, 8 pages.

Mackay, W.E., et al., "Virtual Video Editing in Interactive Multimedia Applications", Communications Of the ACM, Jul. 1989, vol. 32, No. 7, pp. 802-810.

Macromind Mediamaker, Macromind Inc., 1990, pp. 129, 165 and 166.

Matthews, James, et al, "VideoScheme; A Programmable Video Editing System for Automation and Media Recognition", ACM Multimedia 1993.

Ohanian, Tom, "The Avid 1 Media Composer", International Broadcast Engineer, Jan. 1991, pp. 22-23.

Open Media Framework, OMF Interchange Specification, Avid Technology, Inc., Version 2.0, Nov. 29, 1995, pp. i-245.

Pazandak, Paul, et al., "A Multimedia Temporal Specification Model and Language", Technical Report 94-33, University of Minnesota, 1994.

Ryan, Mark, et al., "A Development Process for Large Multimedia Titles", 1994 ACM, pp. 126-138.

Sack, Warren et al., "IDIC": Assembling Video Sequences from Story Plans and Content Annotations", In: Proceedings of IEEE International Conf. on Multimedia Computing and Systems in Boston, MA, IEEE Computer Society Press, pp. 30-36, 1994.

Schleicher, Stephen, "How To Create Web Markers in Premiere 6", Digital Video Editing, Digital Media Online, 2001.

"Schneller Zugriff: Video Machine Von Fast", Radio Fernshen Elektronik, vol. 44, No. 11, Nov. 1, 1995, Berlin, DE.

Siochi, A., et al, "The Integrator: A Prototype for Flexible Development of Interactive Digital Multimedia Applications", Interactive Multimedia, vol. 2, No. 3, 1993, pp. 5-26.

Tonomura, Yoshinobu, "Video Handling Based on Structured Information for Hypermedia Systems", Proceedings of the Int'l Conference of Multimedia Information Systems, Jan. 1991, pp. 333-334.

Ueda, Horotada, et al., "Automatic Scene Separation and Tree Structure GUI for Video Editing", ACM Multimedia 96, Boston, MA, 1996 ACM, pp. 405-406.

Ueda, Hirotada et al., "Automatic Structure Visualization for Video Editing"; Interchi '93, 1993 ACM, Apr. 24-29, 1993, pp. 137-141; 545-546.

Ueda, Hirotada, et al., Impact: An Interactive Natural-Motion-Picture Dedicated Multimedia Authoring System, 1991 ACM, pp. 343-350.

Ueda, Hirotada, et al., "Impact: Interactive Motion Picture Authoring system for Creative Talent", 1993 ACM, p. 525.

Wahl, Thomas, et al., "Representing Time in Multimedia Systems",Proc. IEEE Int'l Conf. on Multimedia, 1994, pp. 538-543.

Van der Sluis, Ielka et al., "Enriching Textual Documents with Timecodes from Video Fragments", In: Proceedings RIAO 2000 Content-Based Multimedia Information Access, Paris, Apr. 2000, pp. 431-440.

Wahl, Thomas, et al., "Tiempo: Temporal Modeling and Authoring of Interactive Multimedia", Proc. Int'l Conf. of Multimedia, 1995, pp. 274-277.

Weiss, Ron., et al., "Content-Based Access to Algebraic Video", Proceeding Int'l Conf. on Multimedia Computing and Systems, pp. 140-151, Boston, MA, May 1994.

Candan, K. Selcuk, et al., "CHIMP: A Framework for Supporting Distributed Multimedia Document Authoring and Presentation"ACM Multimedia 96, Boston, MA, pp. 329-340.

Mines, Robert F. et al., "DAVE: A Plug and Play Model for Distributed Multimedia Application Development", ACM Multimedia 94, San Francisco CA, pp. 59-66.

Nicol, John R., et al., "How the Internet Helps Build Collaborative Multimedia Applications", Communications of the ACM, Jan. 1999, vol. 42, No. 1, pp. 79-85.

* cited by examiner

500 review & approval

My Reviewers List

Store reviewers' information here for easy assignment to Clips and projects. Short descrip and features, instructions go here.

Add reviewers to list

APN Member Name: [_____] 510

Email Address: [_____] 520

Group (optional): [*none* ▽] 530

[Add]

| APN Member Name | Email Address | Group | | |
|---|---|---|---|---|
| S JONES | SJ@AVID.COM | NONE ▽ | | remove |
| P DOE | PD@AVID.COM | LEGAL ▽ | | remove |
| M BAILEY | MB@AVID.COM | LEGAL ▽ | | remove |
| | | ▽ | | remove |
| | | ▽ | | remove |

Manage Groups

Create a group: [_____] [Create] 540

Delete a group: [_____] [Delete] 550

☐ also delete all reviewers in group

*700* review & approval

Balance Beam commercial

Select Clip for Review

Select reviewers for the review, then upload a new clip, or use a clip you've already uploaded. Reviewers will automatically be sent an email informing them they have a clip for review.

| APN Member Name | Email Address | Group |
|---|---|---|
| ☐ | | *none* |
| ☐ | | Cola Core Team |
| ☐ | | Cola Core Team |
| ☐ | | Cola Legal Team |
| ☐ | | Cola Legal Team |

*710*

Assign selected reviewers to review: [rough edit 1 ▽] —720

OR

Assign selected reviewers to a new clip: —730
Path of Clip to Upload: [Path Name]

Short Description of Review: [_____] —740
End Review on: [mm/dd/yyyy] —750

Any comments you have for your reviewers go here.

Be sure to check out 00:12:14 for the lengthened transition we talked about.

—760

[Submit Clip for Review] —770

FIG. 7

FILE_TYPE    R&A
SEQUENCE     SATURN
FPS          24

COLUMN
FRAME IN   FRAME OUT   COMMENT   REVIEWER   COMMENT DATE   COMMENT TIME
  TRACK

DATA
0      0       We need to make a 16:9 version for the PAL markets.
       09:54   V1                                    MEP  00/04/10
1003   1003    Match the skycolor to the previous and next shots.
       10:00   A2                                    MEP  00/04/10
1019   1019    Get rid of the scratch         MEP 00/04/10   10:02 TC1

*FIG. 14*

REVIEW AND APPROVAL SYSTEM

CROSS RELATED APPLICATION

This application is a continuation of prior application Ser. No. 09/543,958, filed Apr. 7, 2000, now abandoned, and is incorporated herein by reference.

FIELD OF THE INVENTION

The present invention relates generally to a computer system that implements an automated review and approval system. In particular the review and approval system incorporates workflow procedures along with the ability to store frame accurate reviewer comments for a review of a video clip.

BACKGROUND OF THE INVENTION

Conventionally, the process of producing an audio/visual work such as a commercial, an infomercial, a television program, or a movie has involved recording and capturing the necessary content for both the audio and visual material, editing the content to produce a draft version of the finished work, and circulating the draft versions of the finished work for review to solicit approval for the work before distribution. Typically, the last step of reviewing the draft versions involves multiple iterations of review.

The review process is time intensive since multiple reviewers are involved, who are usually in different geographical locations. To distribute the work, tapes must be sent out to each reviewer, which in itself is time consuming. For efficiency sake, the reviews are generally performed in an ordered fashion to avoid conflicting change requests that might create delays. At each reviewing level in the hierarchy, a new set of tapes must be created that reflect the prior requested changes.

If the reviewer's comments are in the form of handwritten notes or voicemail, it may be difficult to correlate the comments to the precise location in the work. In order to assure accuracy of the comments at the frame level, the reviewer and the editor may need to review the work together on the phone. While this collaboration produces the desired result, it is also costly in time and expense, and again submits to the possibility of a misunderstanding.

What is needed is a Review and Approval system that permits efficient access by multiple reviewers to the content to be reviewed, and that promotes accuracy in correlating a reviewer's comments with the appropriate portion of the content. In particular, the comments should correspond to an individual frame of the content under review or a sequence of frames. Comments may then be saved and made available for later review.

SUMMARY OF THE INVENTION

The Review and Approval system of the present invention advantageously provides computer implemented access for a reviewer to digital content for the purpose of reviewing and approving the digital content. In one aspect of the invention, the digital content under review is an audio/visual work.

In a further aspect of the invention, the digital content is a visual work that is comprised of digital frames. The digital frames are encoded using the Quicktime format.

In a yet further aspect of the invention, the Review and Approval system consists of cooperating software applications, one which is a client software component that executes at a client computer system while the other is a server software component that executes at a server system. The Review and Approval system of the present invention employs a client/server architecture.

In a further aspect of the invention, the client software component and the server software component interface and communicate over a remote communications network.

In a still further aspect of the invention, the client software component of the Review and Approval system includes an Internet software browser for communicating over the Internet with the server system. The Internet software browser may also permit the execution of a JAVA® applet to implement portions of the Review and Approval system.

In a still further aspect of the invention, the digital content is stored at the server system and transferred to the client system for viewing using the Internet software browser. Video may be played at the Internet software browser at the normal speed at which it was recorded or on a frame by frame basis with the user determining when the next frame is played.

In a further aspect of the invention, a reviewer may enter comments into the Review and Approval system using the Internet software browser. The comments are associated with and correspond to individual frames or a duration of frames that are played by the Internet software browser. The comments are stored at the server system and made available for later viewing.

In yet further aspect of the invention, a reviewer using a pointing device may indicate a location on a frame of video played by the Internet software browser to which comments may apply. In this aspect of the invention, the video along with the pointer markings are stored at the server system and available for later viewing.

In a still further aspect of the invention, comments are entered into the Review and Approval system by recording speech that is input at the client system. The speech is correlated by the Review and Approval system with an individual frame of video data or a sequence of frames, and is transmitted to the server system for storage thereon.

In one aspect of the invention, multiple reviewers may access the Review and Approval system concurrently to review the same content. Each reviewer's comments are stored at the server system, and all the reviewer's comments are available for viewing. The comments are displayed according to the timecode of the video frame.

BRIEF DESCRIPTION OF THE DRAWINGS

For a better understanding of the present invention, together with other and further objects, advantages and capabilities thereof, reference is made to the accompanying drawings, in which:

FIG. 5 depicts the My Reviewers List user interface.

FIG. 7 depicts a user interface for selecting reviewers.

FIG. 14 shows an example of an R&S Interchange file, according to the invention.

DETAILED DESCRIPTION

Figure 1:
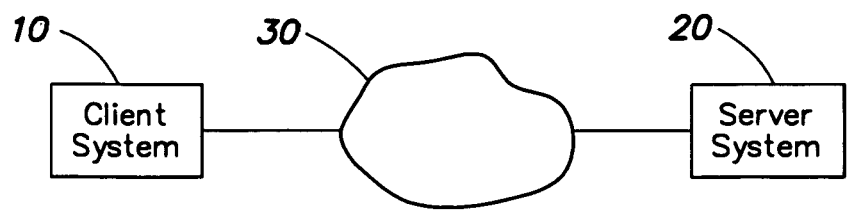
FIG. 1 depicts a schematic of the environment in which the present invention operates.

The drawings and specification illustrate an exemplary system and method of the invention. It is to be understood that the present disclosure is to be considered as an exemplification of the principals of the specific and preferred aspects of the invention. It is not intended to limit the broad aspects of the invention to the illustrated or exemplary embodiments thereof. The review and approval system (hereafter the "R&A system"), according to the present invention will now be described. The R&A system advantageously provides for the automated distribution of video and/or audio clips to one or more reviewers to solicit approval for the work. The R&A system according to the present invention is described with reference to the review of video and audio clips for movies, commercials, infomercials, and the like. However, it is clear that certain aspects of the invention are not limited to a review and approval application for only video, audio or film clips, but have a broader applicability, and the following disclosure should be read in this light Referring now to FIG. 1 there is shown in schematic form the environment in which the present invention operates. Client system 10 is a computer system on which a user invokes the R&A system of the present invention. Client system 10 is typically a personal computer (PC), but may also be a workstation, minicomputer or mainframe computer. One of ordinary skill in the art will clearly recognize that the present invention is not restricted to a specific computer system and is applicable to many different computer system configurations. Client system 10 is connected to a communication network 30 for transmitting and receiving data to and from a server system 20 that is also connected to communication network 30. Communications network 30 may be a Local Area Network (LAN), such as an Ethernet network, or a Wide Area Network (WAN), such as a packet switching network. Communication network 30 may also be a combination of a LAN and WAN, and is in the preferred embodiment of the invention, the Internet. The present invention does not require a specific communication network 30 to practice the invention, and those of ordinary skill in the art will recognize that many communication configurations are applicable to the invention. Server system 20 connects to communication network 30, and is capable of communicating with client system 10 through communication network 30. Client system 10 typically make requests to server system 20, and the server system 20 responds to the request by communicating back to the client system through the communication network 30. Client system 10 and server system 20 conform to the well-known "client/server" architecture. The foregoing discussion has been limited to only one client system and one server system for the sake of simplicity and clarity, but one of ordinary skill in the art will clearly recognize that the environment in which the present invention operates is not so limited. Multiple client systems and multiple server systems may be connected to a communication network 30 for the purpose of communication between the systems (both client and server systems).

For simplicity, the invention herein will be described in relation to a single client system and one server system, but again the invention is not so limited. Each reviewer in the review and approval process may use a different client system to access the R&A system, and communicate over the communication network 30. Communication network 30 provides for the ability to connect many client systems and server systems, and is only limited by performance considerations as is well known in the art.

Figure 2:
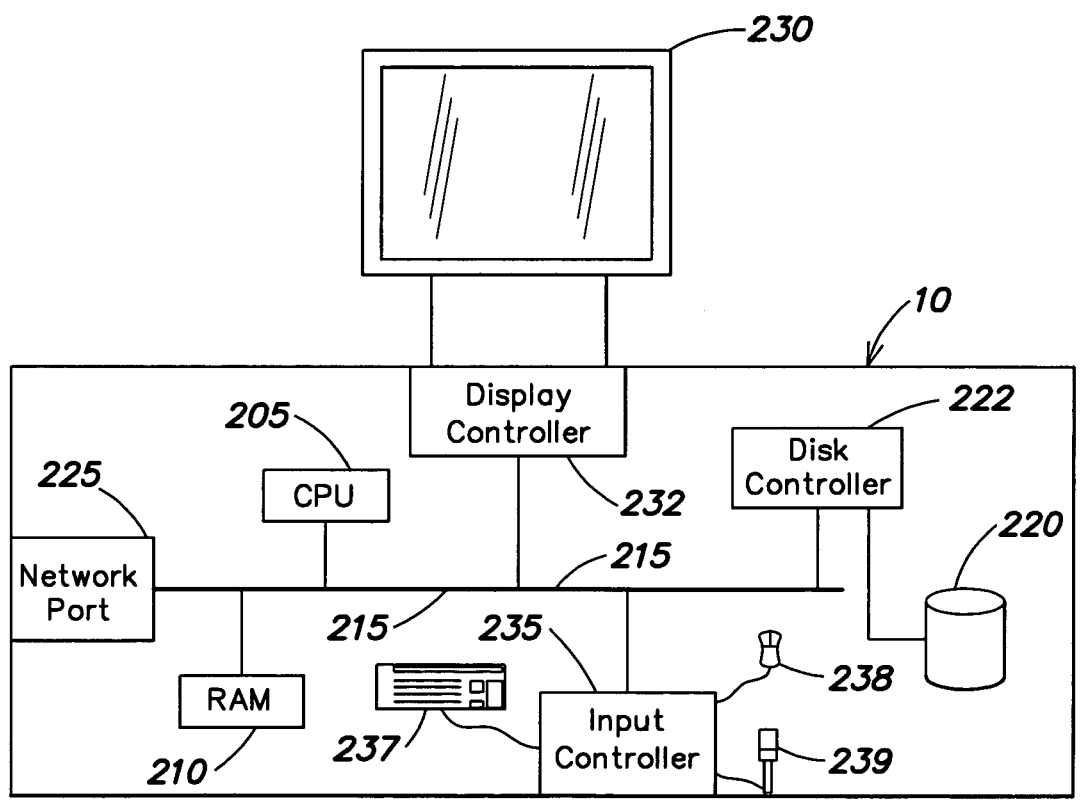
FIG. 2 depicts a computer system as embodied by the client systems or server systems, according to the invention.

FIG. 2 shows a typical computer system as embodied by client system 10, or server system 20 for practicing the invention. For illustrative purposes, client system 10 will be described, but the following description is also applicable to server system 20. Server system 20 may have better performance characteristics than the client systems, due to a faster processor, expanded memory, and a larger non-volatile memory, but generally server system 20 includes the same computer components and peripherals as the client systems.

Client system 10 includes a computer processing unit (CPU) 205, such as a Pentium III processor from Intel Corporation, for executing computer instructions, and a random access memory (RAM) 210 for storing computer instructions and digital data. CPU 205 communicates with RAM 210 via communication bus 215. A storage element 220, such as a magnetic or optical disk, for storing non-volatile digital data also connects to communication bus 215 through a disk controller 222. Communication bus 215 also allows communication of messages and data between storage element 220 and CPU 205 or RAM 210. Client system 10 further includes a network port 225 for communicating data over communication network 30, and an input controller 235, such as a keyboard 237 for keying in data, a pointer device 238, such as a mouse, or a microphone 239 for entering information into client system 10. Client system 10 also include a display device 230, such as a display monitor, for viewing multimedia data such as video clips and graphical information, and is interfaced to communication bus 215 through display controller 232.

Client system 10 executes computer software including computer instructions for implementing a review and approval system, in the preferred embodiment of the invention. In one embodiment of the invention, client system 10 executes an Internet software browser such as Netscape Navigator from Netscape Corporation of Mountainview, Calif. or Internet Explorer from Microsoft Corporation of Redmond, Wash. for communicating over communication network 30 to server system 20 and uses the HTTP protocol to invoke the review and approval services at server system 20. Server system 20 includes computer software for executing portions of the R&A system, according to the present invention.

Figure 3:
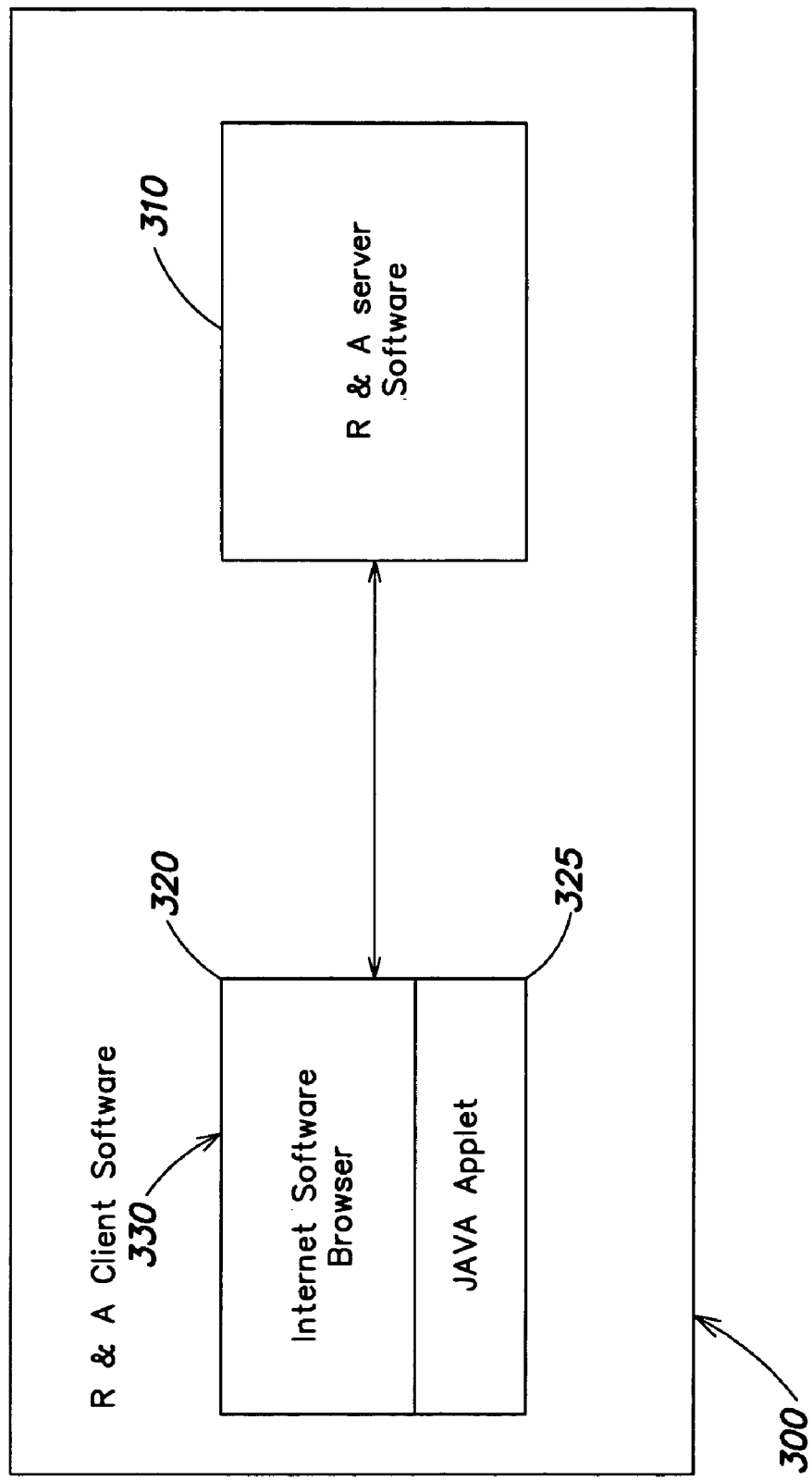
FIG. 3 shows a schematic diagram of the server and client software, according to the invention.

As shown in FIG. 3, the R&A system 300 includes R&A server software 310 that executes on server system 20, and interfaces, in one embodiment of the invention, to R&A client software 330 that executes at client system 10. In one embodiment of the invention, as shown in FIG. 3, R&A server software 310 interfaces to an Internet software browser 320, executing on client system 10. The Internet software browser 320, executing on client system 10, includes the R&A client software 330 that executes as a JAVA® applet 325 at client system 10. The R&A client software 330 typically resides on server system 20, and is transmitted from server system 20 to client system 10 for execution at client system 10 under control of a JAVA® virtual machine (not shown) incorporated in the Internet software browser 320. JAVA® is a software specification from Sun Microsystems of Mountainview, Calif. for executing a custom computer application in association with a web browser at the client system. JAVA® is a registered trademark of Sun Microsystems. The R&A server software 310 and R&A client software 330 communicate using the HyperText Transfer Protocol (HTTP) for requesting and delivering data and the HyperText Mark-up Language (HTML) for encoding the data. The HTTP protocol, JAVA® and HTML are well known to those of ordinary skill in the art, and thus there it is not necessary to describe them in further detail here.

The R&A server software 310 and R&A client software 330 execute as cooperative computer applications, and together implement the R&A system 300 of the present invention. While the preferred embodiment of the invention is implemented as a web browser application executing over the Internet, it should be apparent to those of ordinary skill in the art that the invention described herein can be readily implemented as two cooperative computer applications interfacing remotely over any suitable communications network or even as a single computer application in which the functionality of the server and client software are combined in one computer system.

Having described, in general, the hardware and software environment in which the present invention operates, further details of the R&A system will now be described. Again, the invention is described for illustrative purposes in relation to a R&A system for reviewing video, film, or audio clips, but one of ordinary skill in the art will recognize that aspects of the invention are applicable to other review applications, and the scope of the invention is not contemplated to encompass only a review process associated with these media.

In the preferred embodiment of the invention, the R&A system 300 is invoked at client system 10 by initiating execution of an Internet web browser 320 as earlier described, and directing Internet web browser 320 to contact the R&A system 300 at server system 20 by addressing the system with a specific Universal Resource Locator (URL). In the preferred embodiment of the invention, Internet web browser 320 initiates R&A system 300 by addressing the URL, www.AvidProNet.com, and the R&A system will be described in relation to this embodiment.

After initiating contact with the R&A system 300 at server system 20 through Internet web browser 320, the R&A system may optionally required the user at client system 10 to "logon" to the system for identification purposes. The identification process allows the R&A system 300 to customize its response to the user, but this is not a requirement of the invention.

Review and Approval Workflow

Figure 4:
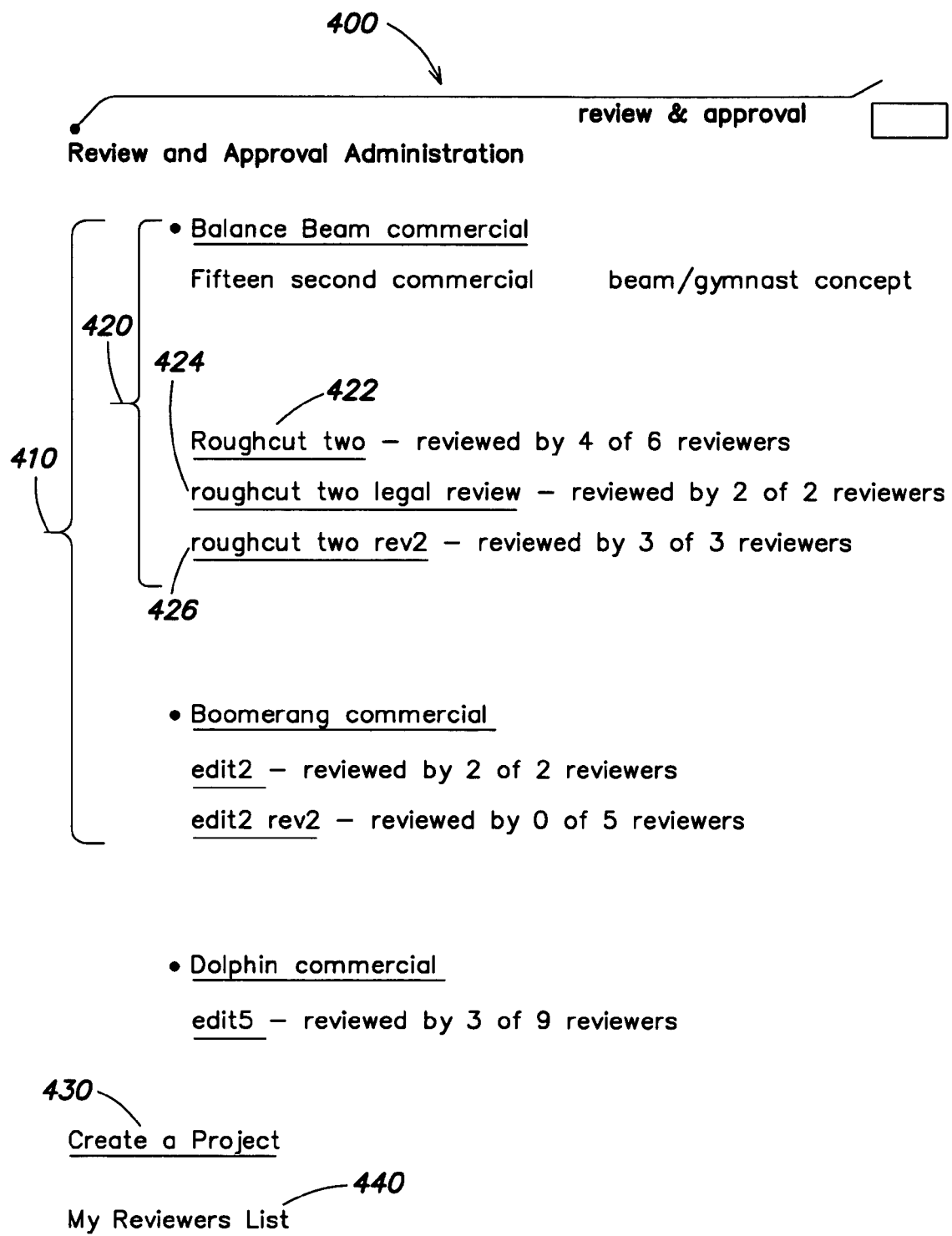
FIG. 4 depicts the Review and Approval Administration user interface.

With the "logon" process completed, the user of the system is presented with a user interface as shown in FIG. 4 for navigating through the R&A system 300. In the following figures, underlined text indicates that the text may be selected by an input device such as a mouse to solicit additional information that is associated with the text. The R&A system according to the current invention tracks the review process associated with a project. A project may consist of multiple tasks under review, and in the preferred embodiment each project includes media content having one or more media clips for review. The media clips may be either video or audio clips. The "Review and Approval Administration" user interface 400 provides information about the status of pending projects under review and permits the user to create a new project for review. The "Review and Approval Administration" user interface 400 indicates in a pending project list 410 that three projects are pending in the review process. One of the pending projects is the "Balance Beam commercial" 420 that includes a sequence of three reviews: roughcut two 422, roughcut two legal review 424, and a roughcut two rev2 426 review. The review status is also presented for each of the reviews 422, 424, and 426. For example, the roughcut two 422 status indicates that 4 out of the 6 reviewers have reviewed the commercial. Since the text is underlined, further information is available for the roughcut two 422 review. The "Review and Approval Administration" user interface 400 also provides for the ability to create a project and review a directory of reviewers by choosing the respective selection option 430 or 440.

Selecting "My Reviewers List" from "Review and Approval Administration" user interface 400, a user of the R&A system 300 is presented with a user interface 500 for adding or removing reviewers from a global directory of reviewers. The directory provides an easy mechanism to store a reviewer's data for later assignment to a project, and also permits the grouping of reviewers to provide an efficient way to assign multiple reviewers to a project. User interface 500 includes entry fields for entering a name 510, an email address 520 and optionally a group designation 530 for each reviewer. The group designation allows multiple reviewers to, be selected by a common designation. For example the all attorneys in the Legal Department could be selected as reviewers by specifying the group name "Legal". In the preferred embodiment of the invention, each reviewer subscribes to the services provided at the web site www.AvidProNet.com (APN) by Avid Technology Inc. of Tewksbury, Mass., and thus an APN membership identifier can identify an individual. The "My Reviewers List" user interface 500 also permits the creation of a group 540 and the deletion of a group 550, including optionally the deletion of all the reviewers associated with the group 560.

Figure 6:
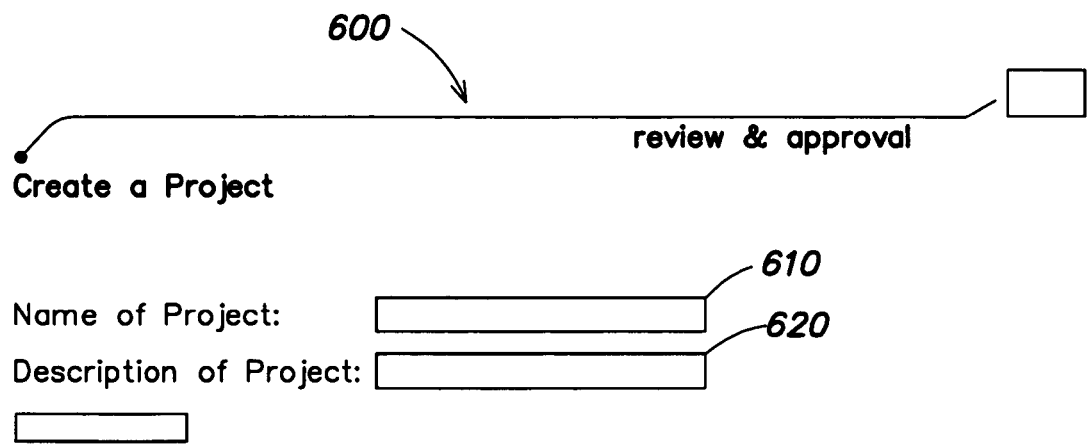
FIG. 6 depicts the Create a Project user interface.

If a project is to be created as determined by the user in the "Review and Approval Administration" user interface 400, a "Create a Project" user interface 600, as shown in FIG. 6, is presented to the user for soliciting a project name 610 and a description of the project 620.

Having specified a new project for review as shown in FIG. 6, the user is presented with user interface 700 for identifying clips that are to be reviewed by individual reviewers. The reviewers are selected from the list of reviewers 710 in the global directory that was earlier created. The selected reviewers are assigned a clip, which in the preferred embodiment of the invention is a video or audio clip, to review by identifying a clip 720 residing on server system 20 or specifying a path name to access the clip 730 on another system. A short description of the review 740 and the date for completion of the review 750 may be entered. Instructions 760 for the reviewers may also be entered in free form. Having completed the assignment process, the user submits the clip for review 770 to the designated reviewers. The reviewers are notified, in one practice of the invention, by email of their assignments, but other ways of notification are contemplated to be within the scope of the invention. For example, reviewers may be notified when they "logon" to the R&A system 300.

Figure 8:
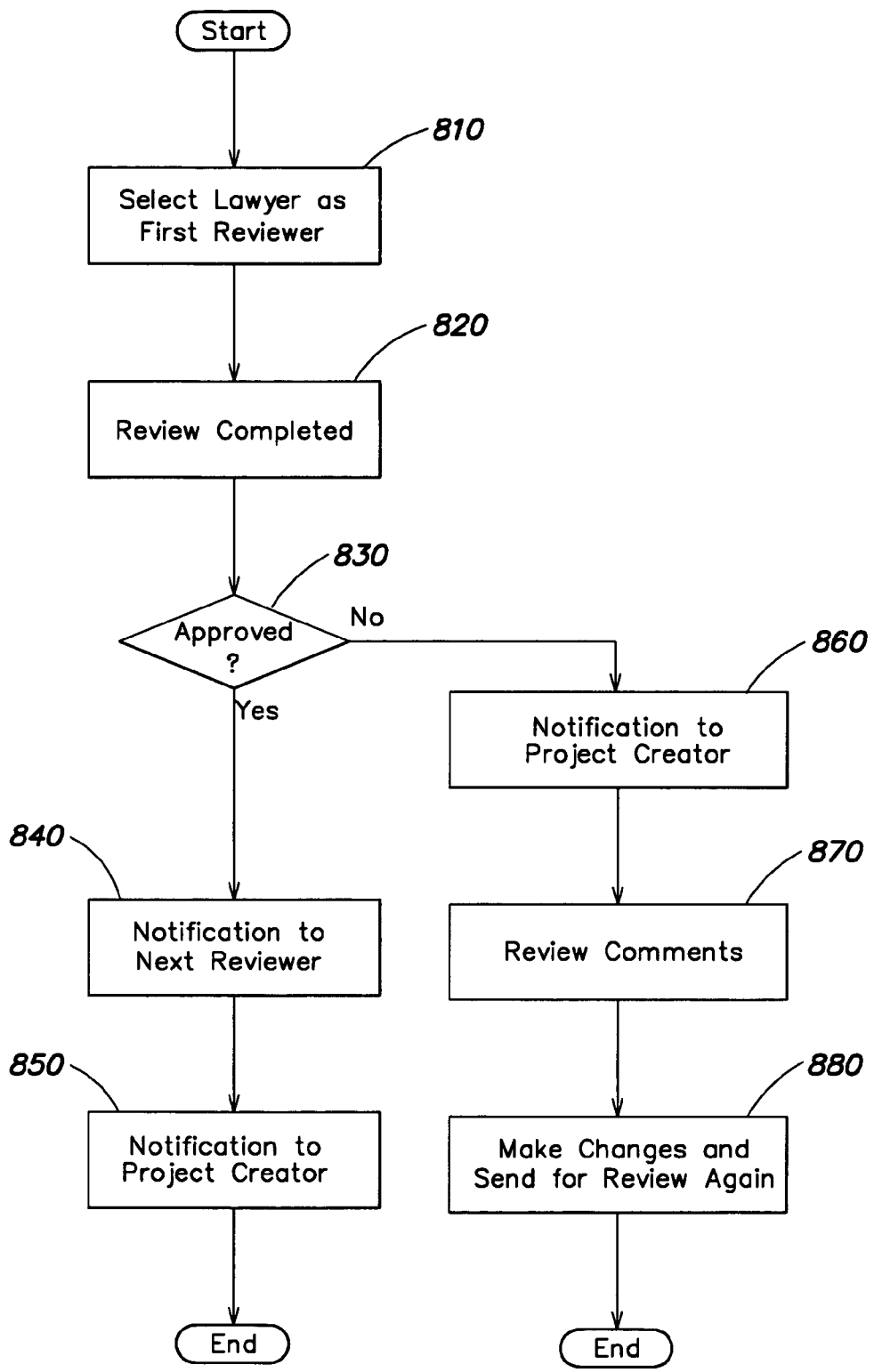
FIG. 8 shows as a flow chart an example of a Review and Approval workflow that is sequenced, according to the invention.

In FIG. 8 there is shown an example of an alternative embodiment of the invention in which the workflow process permits the reviews to be sent out in an ordered manner. For example, the project creator determines that a lawyer needs to see and approve the sequence before any other reviews take place. The creator selects the lawyer as the first reviewer, as shown in step 810, and indicates that the lawyer's approval is necessary before the sequence is sent on to the next reviewer.

The lawyer completes the review, step 820, and indicates whether the sequence can be sent on to the next reviewer. If it is approved, step 830, notification is sent to the next reviewer, step 840, and notification of approval is sent to the project creator, step 850. If it is not approved the project creator receives notification of the rejection, step 860, and he can view the comments, step 870, and make the appropriate changes to the project before sending it out for review again, step 880.

In this embodiment of the invention, a template workflow is generated that ensures the correct order of review events based on the role a reviewer plays in a project. Templates provide a mechanism for the R&A administrator to build in both the correct business logic and correct role-based workflow for each project. For example, a firm is currently engaged in producing three different television programs, each of which has a set of reviewers and a correct order of review events. One program must have every sequence reviewed by the legal team before any further reviews can take place and their comments must be routed to both the project creator and the Executive Producer. Another program requires a legal review only at the end of the process. The third program requires that the Executive Producer and Producer be the first set of reviewers and that their reviews must occur simultaneously. The R&A administrator builds templates for each program and stores them on the R&A server. The project creator can then initiate a complete role-based workflow around a specific sequence with one click, ensuring correctness and minimizing the chance that a person will be skipped in the R&A process.

Figure 9:
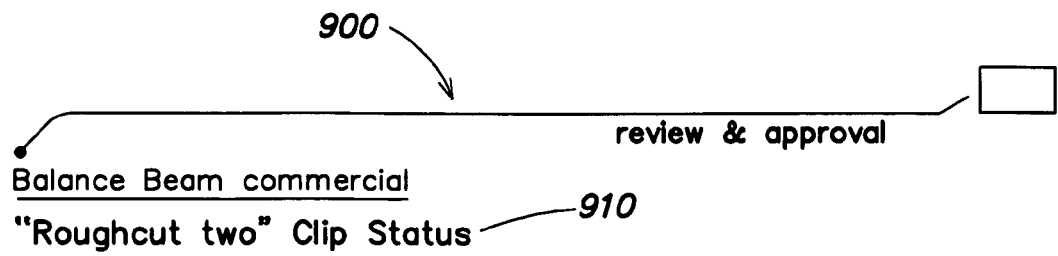
FIG. 9 depicts a user interface for reporting reviewer status.

The R&A system 300 of the present invention also includes the ability to determine the status of the review process as shown in FIG. 9. FIG. 9 depicts a user interface 900 for displaying the status of individual clips assigned for review. The clip 910 is identified, and the review status 920 for each reviewer is reported. As is shown in FIG. 9, the review status 920 includes the group designation, if applicable, for each reviewer. A selection box 930 is provided for viewing the comments of those reviewers that have completed their review. The comments from all the reviewers who have completed their review may be viewed by selecting button 930, or only the comments of selected reviewers may be viewed by selecting button 940.

Figure 10:
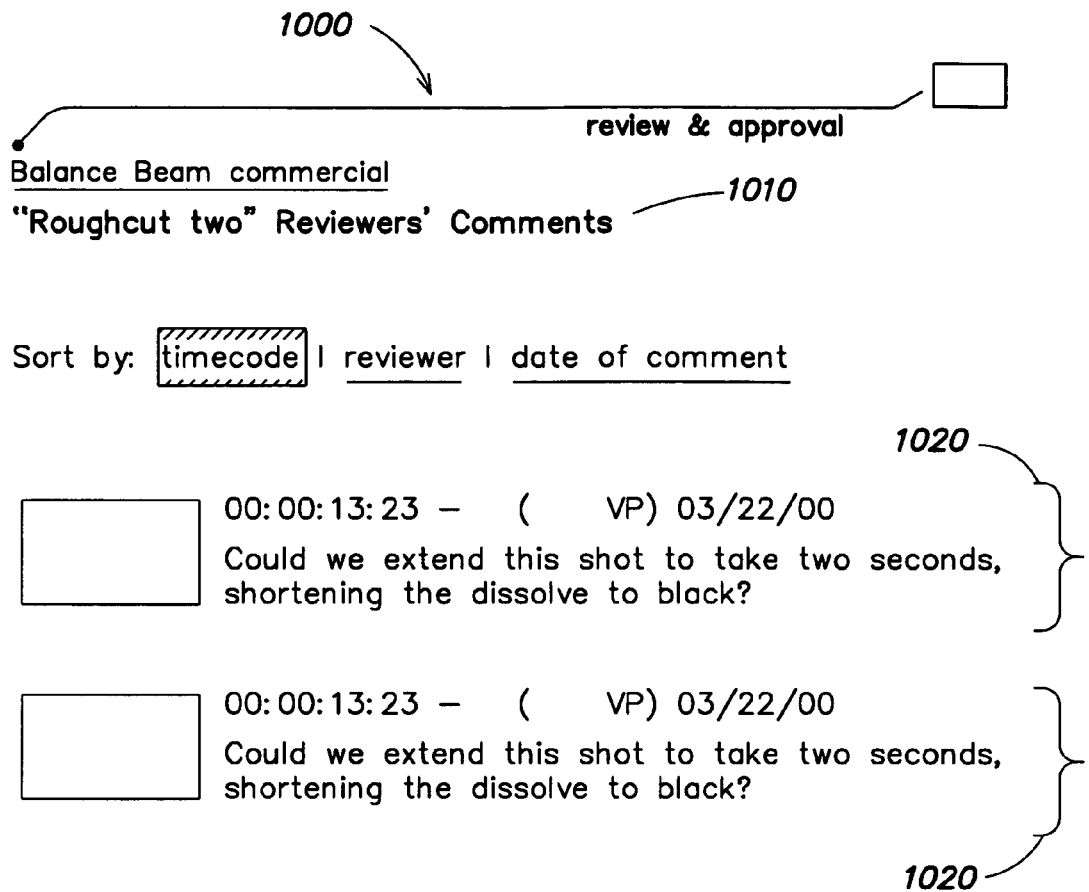
FIG. 10 depicts a user interface for displaying reviewer comments.

Referring now to FIG. 10, there is shown a list of all the completed reviewer's comments 1000 for a selected clip 1010. Comments 1020 may be displayed by timecode, reviewer, or date of the comment. As was earlier discussed, the present R&A system 300 is described in terms of a review of video clips corresponding to a commercial, infomercial, movie or the like, and thus, in thus embodiment, a timecode identifies a frame of video.

The Review Process

Having described the process for assigning media content for review, according to the invention, the review functionality of the present invention will now be described. R&A system 300 will be further described with reference to video data. However, the invention is not limited to video data, but encompasses media content including but not limited to audio data, and graphical data. In a preferred embodiment of the invention, R&A system 300 is invoked at server system 20 by directing an Internet web browser 320 at client system 10 to contact a specific URL associated with R&A system 300, as earlier described. After a reviewer "logs on" to R&A system 300, the reviewer is presented with a list of assignments for review. Each assignment includes one or more video clips for review. A video clip consists of a series of video frames in digital form. Each video frame from the clip is associated with a timecode that uniquely identifies the video frame. In one practice of the invention, the video clips are encoded according to the QUICKTIME format from Apple Computer of Cupertino, Calif. However, one of ordinary skill in the art will recognize that the present invention is not limited or restricted to the QUICKTIME format, and other encoding formats may be used to practice the invention. The video clips for review are digitally stored on server system 20 and transmitted to client system 10 for playing the video clips during the review process. Consequently, client system 10 includes a video player to play the appropriate format. If the media content is audio, the audio is digitized prior to storage at server system 20, and partitioned into audio frames, having an appropriate number of digital samples for providing reviewer comments. The audio frames are ordered in a well-defined manner to uniquely identify them.

Figure 11:
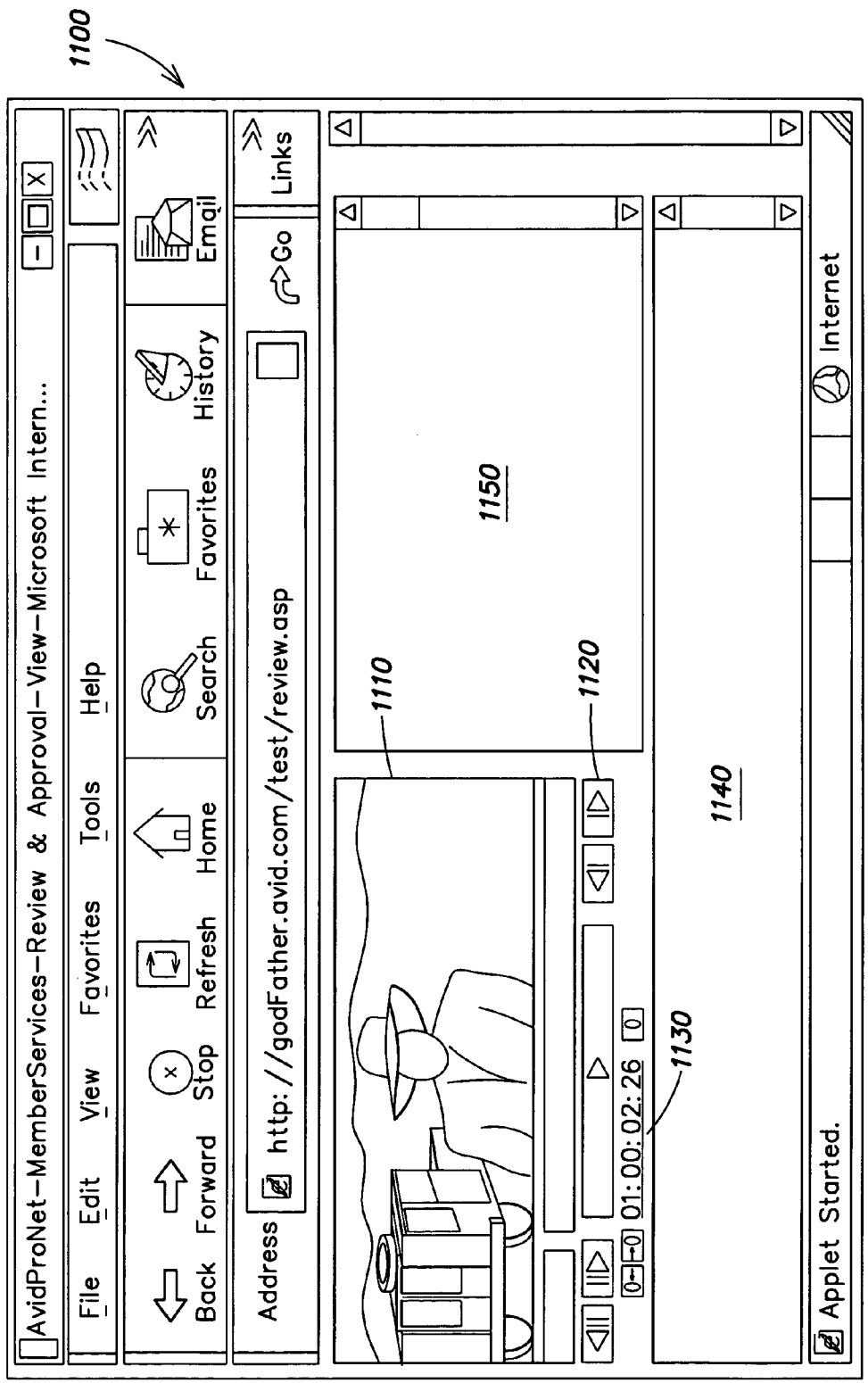
FIG. 11 depicts a user interface for entering reviewer comments that are associated with an individual video frame.

After selecting an assignment for review, the reviewer is presented, as depicted in FIG. 11, with a review user interface 1100 at Internet web browser 320 on client system 10. Review user interface 1100 includes a video window 1110 for playing the video clip to be reviewed. Using buttons 1120, the selected video clip can be played at normal speed or on a frame by frame basis. The clip can be played in a fast forward mode or reversed. For each frame displayed in video window 1110, the timecode 1130 of the frame is displayed. The review user interface 1100 further includes a comment window 1140 for entering comments in free form corresponding to the displayed frame. In one embodiment of the invention, the R&A client software 330 includes voice recording software for recording comments corresponding to the displayed frame that are orally entered through a microphone. The voice comments can be selected for an individual frame and played back for review. Voice comments may be stored in a ".wav" file, but one of ordinary skill in the art will recognize that other formats are acceptable for practicing the invention. In general the only requirement is that the voice which is associated with a particular frame be captured digitally for transmission to the server system 20. In yet a further embodiment of the invention, the R&A client software 330 includes support for voice recognition software such as supplied by Dragon Systems of Newton, Mass. for entering text into comment window 1140 using a microphone. The voice recognition software converts speech to text, and the text is captured in the comment window. Review user interface 1100 also includes a history window 1150 that indicates a history, according to timecode, of the comments made for the video clip by a reviewer.

Figure 12:
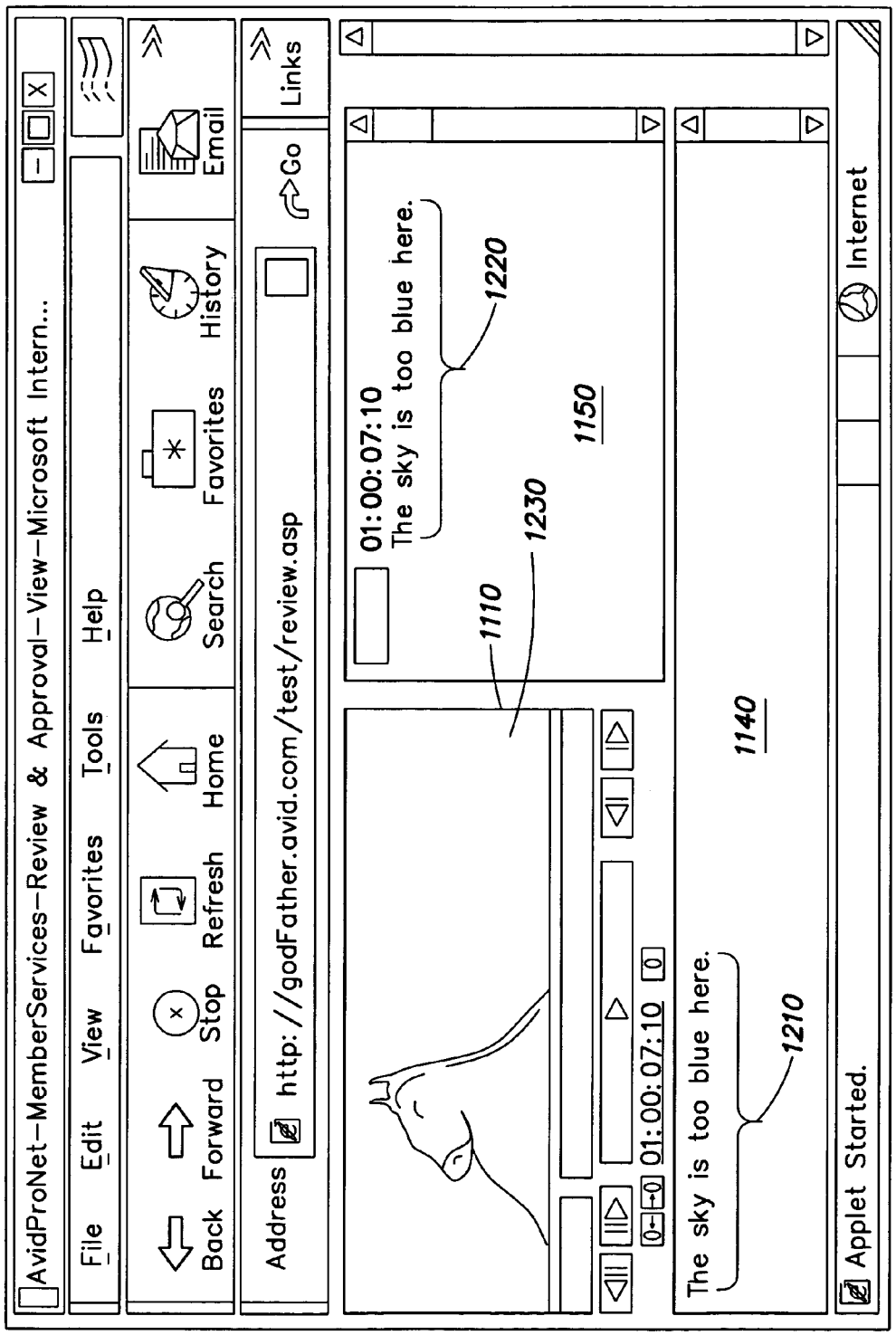
FIG. 12 shows the user interface of FIG. 11 with a single comment provided.

FIG. 12 shows a comment 1210 that is associated with a video frame having timecode 01:00:07:10. In one embodiment of the invention and as shown in FIG. 12, a pointer device such as a mouse is used to outline an area that corresponds to the comment 1210. Using FIG. 12 as an example, ring 1230 outlines in which the sky is too blue. When the comments are reviewed, the frame can be blown up to show the outlined area. The history window 1150 also includes a history record 1220 of the comment.

Figure 13:
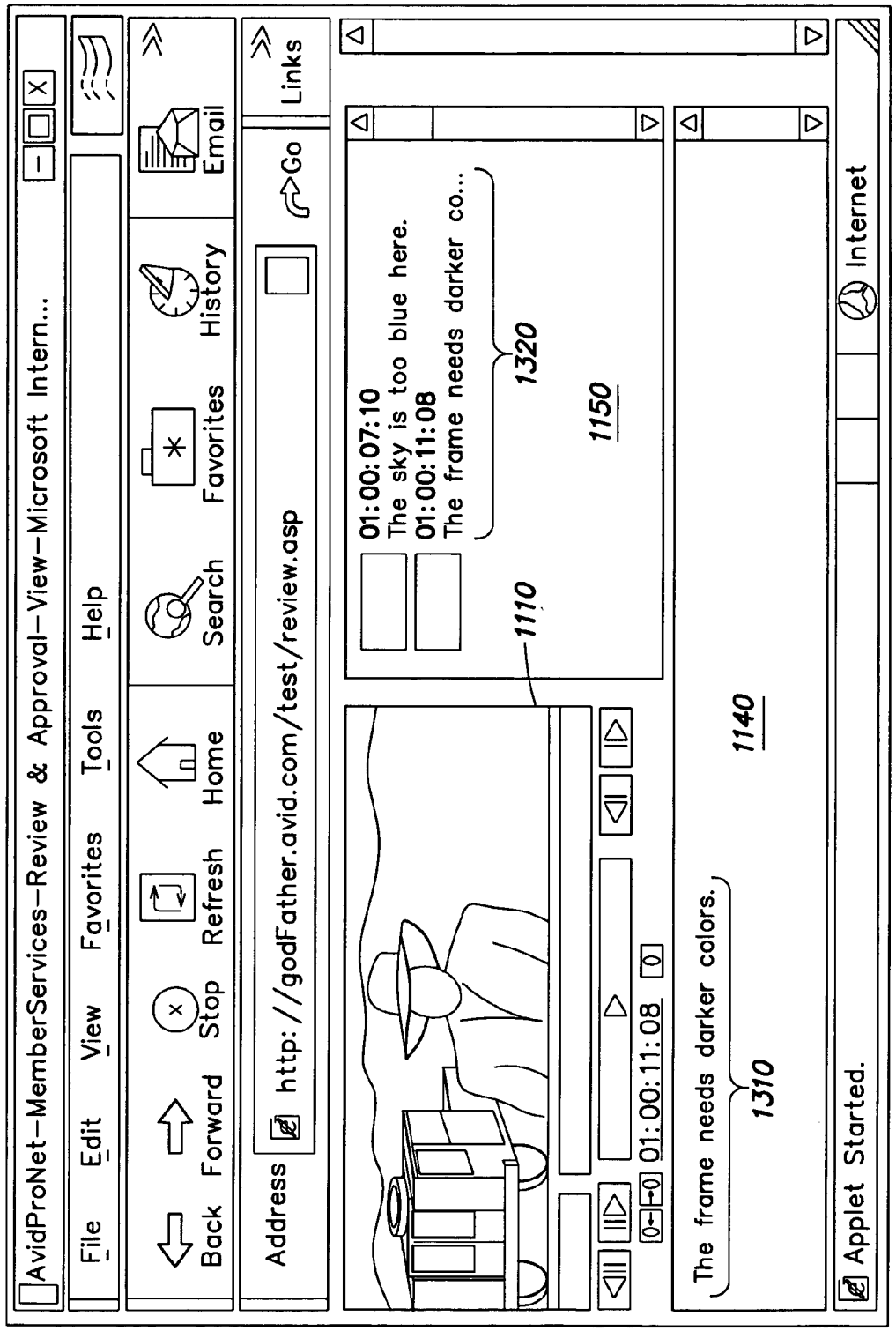
FIG. 13 shows the user interface of FIG. 11 with a second comment provided.

FIG. 13 shows a second comment 1310 that has been entered into the comment window 1140 by a reviewer. The second comment 1310 is associated with a video frame having timecode 01:00:11:08. A second history record 1320 is stored in the history window 1150. As was earlier discussed, the history window 1150 includes a history of all the comments made by a reviewer, and thus the first comment 1220 by the reviewer at timecode 01:00:07:10 is also included in the history window 1150.

Review and Approval Interchange

In a further embodiment of the invention, R&A system 300 receives an R&A Interchange file that is generated by an editing system such as the Media Composer from Avid Technology, Inc., and incorporates comments produced at the editing system with the original comments of the reviewers. The comments generated at the editing system may be a response to original comments, and thus the R&A Interchange file provides allows a continuous dialog between the reviewers and the editors on the editing system.

R&A system 300 includes generating an R&A Interchange file for directly communicating R&A metadata with an editing system. R&A metadata may include without limitation the reviewer's identification, the comments of each individual reviewer, and the time of the reviewer's comments. The comments of reviewers can thus be integrated into the timeline by the editing system and are selectable on a frame basis by the editor. An example of such an editing system is the Media Composer® that is sold by Avid Technology, Inc. of Tewksbury Mass.

The R&A Interchange file is a TAB delineated file format with basic global information in the header. The data fields can be specific to already existing bin column data or can be extended by any custom data the user wishes to add on per clip basis. In the case of the R&A system 300, it permits additional information to be associated with a point in time (a frame) or optionally a duration (a series of frames).

Header information will describe the file type and global information as it relates to the review and approval process.

Header

"FILE_TYPE" will be "R&A" to specify that this is a Review and approval" file and will not import directly "FRAME IN" is the frame reference. This field can contain a total frame count, which is an offset from zero (0) where (0) is the first frame of the sequence/movie. This field can also contain a timecode based on the FPS described in the GLOBAL.

"FRAME OUT" is an optional field used to describe a duration of a comment. If used, the review and approval track will create a container for that range with all comments inside. FRAME OUT can be the same value as FRAME IN. This will indicate a single moment in time versus a range.

"COMMENT" is the actual text entered by the reviewer during the R&A session. There will be no limitation to the amount of characters entered in this field other than the use of a TAB character.

"REVIEWER" is the name of the reviewer taken from the log-in used by the user in this session.

"COMMENT DATE" is the date at the time the comment was created. This will be expressed in military date year/month/day to avoid confusion across countries.

"COMMENT TIME" is the local time at the time the comment was created. This will be expressed in military time "TRACK" is the track on which the comment is describing. Data can be V1-Vx and A1-Ax "DATA" is the actual field data described in the COLUMN separated by <TAB>

A sample file description follows along with a formatted sample file as shown in FIG. 14.

```
FILE_TYPE<TAB>R&A<RETURN>
SEQUENCE<TAB>SEQUENCE NAME<RETURN>
FPS<TAB>24<RETURN>
<RETURN>
COLUMN<RETURN>
FRAME IN<TAB>FRANE OUT<TAB>COMMENT<TAB>REVIEWER<TAB>COMMENT
DATE<TAB>COMMENT TIME<RETURN>
<RETURN>
DATA<RETURN>
0<TAB>0<TAB>FADE
IN<RETURN>MEP<TAB>00/03/01<TAB>09:54<RETURN>
120<TAB><120><TAB>SHORTEN OUTGOING
<TAB>MEP<TAB>00/03/01<TAB>09:57<RETURN>
157<TAB><157><TAB>TRY A DISSOLVE INSTEAD OF A WIPE<TAB>
MEP<TAB>00/03/01<TAB>10:02<RETURN>
``` into a bin. This is the internal information on the file type in addition to the three letter extension at the file level with .RNA "SEQUENCE" will become name of sequence being reviewed to do a quick string compare upon importing file into review and approval "FPS" will support "FRAMES" to indicate that the data for frame markers are frame based, and not specific to any particular frame rate. Other valid data can be 24fps, 25fps, and 30fps SMPTE timecode to indicate the rate of the master track used to navigate the R&A session.

Body

"COLUMN" is the indicator that this row will be the header name from the data field. TABS separate these fields.

While a preferred embodiment of the invention has been set forth, variations may occur to those skilled in the art, that are within the scope of the invention, as defined in the following claims.

The invention claimed is:

1. A review and approval system for media content comprising a plurality of frames of digital data, comprising:
a player for playing the media content, the media content comprising multiple media clips placed together by an editor using an editing system;
a review and approval administration interface for receiving a list of a plurality of reviewers to provide the comments, the review and approval administration interface being further operable to provide notification to the reviewers on the received list that a project is ready for review;

a comment receiver for receiving an indication from a reviewer of a start frame and an end frame of a selected one or more of the plurality of frames, and for receiving comments from the reviewer pertaining to the selected one or more of the plurality of frames of the media content; and a storage manager for storing the received comments from the plurality of reviewers in frame accurate correspondence with the selected one or more of the plurality of frames of digital data to which the received comments pertain, along with an indication of the reviewer providing the comment.

2. The review and approval system of claim 1 wherein the media content includes video data ordered by time code.

3. The review and approval system of claim 1 wherein the media content includes audio data.

4. The review and approval system of claim 1 wherein the comments can be communicated to the editing system and changes associated with the comments can be implemented by an editor using the editing system.

5. The review and approval system of claim 1 wherein the comments include text.

6. The review and approval system of claim 1 wherein the comments include voice comments.

7. The review and approval system of claim 1 wherein the player and the comment receiver execute on a first computer system and the storage manager executes on a second computer system, and the first computer system and the second computer system are coupled by a communications network.

8. A review and approval system for reviewing media content by a reviewer and capable of communicating with a media editing system, comprising:

a player for playing the media content wherein the media content comprises a plurality of frames of digital data, the frames corresponding to multiple media clips placed together by an editor using an editing system;

a review and approval administration interface for receiving a list of a plurality of reviewers to provide the comments, the review and approval administration interface being further operable to provide notification to the reviewers on the received list that a project is ready for review;

a comment receiver for receiving an indication from a reviewer of a start frame and an end frame of a selected one or more of the plurality of frames, and for receiving comments by the reviewer, corresponding to the selected one or more of the plurality of frames of the media content; and a storage manager for storing the received comments from the plurality of reviewers in frame accurate correspondence with the selected one or more of the plurality of frames of digital data to which the received comments correspond, along with an indication of the reviewer providing the comment, and a file generator for producing a data file of the received comments for informing the media editing system of the comments by the reviewer.

9. The review and approval system of claim 8 wherein the data file has a data structure identifying the reviewer and the comment received from the reviewer.

10. The review and approval system of claim 8 wherein the data file has a data structure identifying a frame rate for playing the media content.

11. The review and approval system of claim 8 wherein the data file has a data structure identifying the selected one or more of the plurality of frames of digital data that correspond to the received comments.

12. The review and approval system of claim 8 wherein the data file indicates that the data file contains the comments of the review and approval system.

13. The review and approval system of claim 8 wherein the media content includes video data ordered by timecode.

14. The review and approval system of claim 8 wherein the media content includes audio data.

15. The review and approval system of claim 8 wherein the comments can be communicated to the editing system and changes associated with the comments can be implemented by an editor using the editing system.

16. The review and approval system of claim 8 wherein the comments include text.

17. The review and approval system of claim 8 wherein the comments include voice comments.

18. The review and approval system of claim 8 wherein the player and the comment receiver execute on a first computer system and the storage manager executes on a second computer system, and first computer system and the second computer system are coupled by a communications network.

19. A computer program product, comprising:

a computer readable memory; and computer readable instructions stored in the computer readable memory, wherein the instructions, when executed by a computer, instruct the computer to perform a process for reviewing a media content and providing comments by a user with respect to the media content, comprising:

playing the media content, wherein the media content comprises a plurality of frames of digital data, the frames corresponding to multiple media clips placed together by an editor using an editing system;

receiving a list of a plurality of reviewers to provide the comments;

providing notification to the reviewers on the received list that a project is ready for review;

receiving an indication from a reviewer of a start frame and an end frame of a selected one or more of the plurality of frames;

receiving comments from the plurality of reviewers pertaining to the selected one or more of the plurality of frames of the media content, along with an indication of the reviewer providing the comment; and storing the received comments in frame accurate correspondence with the selected one or more of the plurality of frames of digital data to which the received comments pertain, along with the indication of the reviewer providing the comment.

20. A computer program product, comprising:

a computer readable memory; and computer readable instructions stored in the computer readable memory, wherein the instructions, when executed by a computer, instruct the computer to perform a process for reviewing a media content and providing comments by a reviewer with respect to the media content and communicating the comments to a editing system, comprising:

playing the media content wherein the media content comprises a plurality of frames of digital data, the frames corresponding to multiple media clips placed together by an editor using an editing system;

receiving a list of a plurality of reviewers to provide the comments providing notification to the reviewers on the received list that a project is ready for review;

receiving an indication from a reviewer of a start frame and an end frame of a selected one or more of the plurality of frames;

receiving comments by the reviewer, corresponding to the selected one or more of the plurality of frames of the media content, along with an indication of the reviewer providing the comment; and communicating the comments of the reviewer, and a frame accurate indication of the selected one or more of the plurality of frames to which the comments correspond, along with an indication of the reviewer providing the comment, to the editing system.

21. The computer program product of claim 20, wherein the process for reviewing media content and providing comments by a user corresponding to the media content and communicating the comments to an editing system further includes communicating the one or more plurality of frames of digital data corresponding to the comments to the editing system.

22. The computer program product of claim 20, wherein the process for reviewing media content and providing comments by a user corresponding to the media content and communicating the comments to an editing system further includes communicating to the editing system that the communicated comments originated at the review and approval system.

* * * * *